United States Patent
Kanbara

(10) Patent No.: US 10,148,218 B2
(45) Date of Patent: Dec. 4, 2018

(54) PANEL FIXING DEVICE AND PANEL INSTALLATION METHOD

(71) Applicant: TAKASHIMA & CO., LTD., Tokyo (JP)

(72) Inventor: Takayuki Kanbara, Anjyo (JP)

(73) Assignee: TAKASHIMA & CO., LTD., Tokyo (JP)

( * ) Notice: Subject to any disclaimer, the term of this patent is extended or adjusted under 35 U.S.C. 154(b) by 0 days.

(21) Appl. No.: 15/902,020

(22) Filed: Feb. 22, 2018

(65) Prior Publication Data

US 2018/0183381 A1    Jun. 28, 2018

Related U.S. Application Data

(63) Continuation of application No. PCT/JP2016/075876, filed on Sep. 2, 2016.

(30) Foreign Application Priority Data

Sep. 2, 2015 (JP) .................................. 2015-172887

(51) Int. Cl.
*H02S 20/23* (2014.01)

(52) U.S. Cl.
CPC .................................... *H02S 20/23* (2014.12)

(58) Field of Classification Search
CPC .............. H02S 20/23; Y10T 29/49735; Y10T 29/49739; Y10T 29/49963
USPC ................................................. 24/427, 417
See application file for complete search history.

(56) References Cited

U.S. PATENT DOCUMENTS

2003/0070368 A1   4/2003   Shingleton
2011/0179606 A1   7/2011   Magno, Jr. et al.

FOREIGN PATENT DOCUMENTS

| JP | 2011-196029 A | 10/2011 |
| JP | 2011-223032 A | 11/2011 |
| JP | 2012-180668 A | 9/2012 |
| JP | 2013-87579 A | 5/2013 |
| JP | 2014-163080 A | 9/2014 |

(Continued)

OTHER PUBLICATIONS

English Translation Sharp Corp. JP2011223032 Nov. 4, 2011.*

(Continued)

*Primary Examiner* — David Bryant
*Assistant Examiner* — Amanda Meneghini
(74) *Attorney, Agent, or Firm* — John P. White; Cooper & Dunham LLP

(57) ABSTRACT

A fixing device (1) according to a present invention includes a pressing tool (10) that abuts a part of a peripheral portion of a panel that is arranged on an upper surface portion of a hollow rod-like rack member (200) that has on the upper surface portion a slit-like opening portion extending along a longitudinal direction, a fixing tool (20) that abuts a back surface of the upper surface portion, the fixing tool configured insertable to the opening portion, and having in one direction a width wider than a width in a direction orthogonal to a longitudinal direction of the opening portion, and a fastening member (30) that integrally fixes the pressing tool (10) and the fixing tool (20) that abut a part of the peripheral portion of the panel and the back surface of the upper surface portion of the rack member (200), respectively.

5 Claims, 14 Drawing Sheets

(56) References Cited

FOREIGN PATENT DOCUMENTS

JP 2016-098605 A 5/2016

OTHER PUBLICATIONS

English translation of the International Preliminary Report on Patentability (Chapter I of the Patent Cooperation Treaty) dated Mar. 6, 2018 in connection with PCT International Application No. PCT/JP2016/075876.
International Search Report dated Oct. 4, 2016 in connection with PCT International Application No. PCT/JP2016/075876.

\* cited by examiner

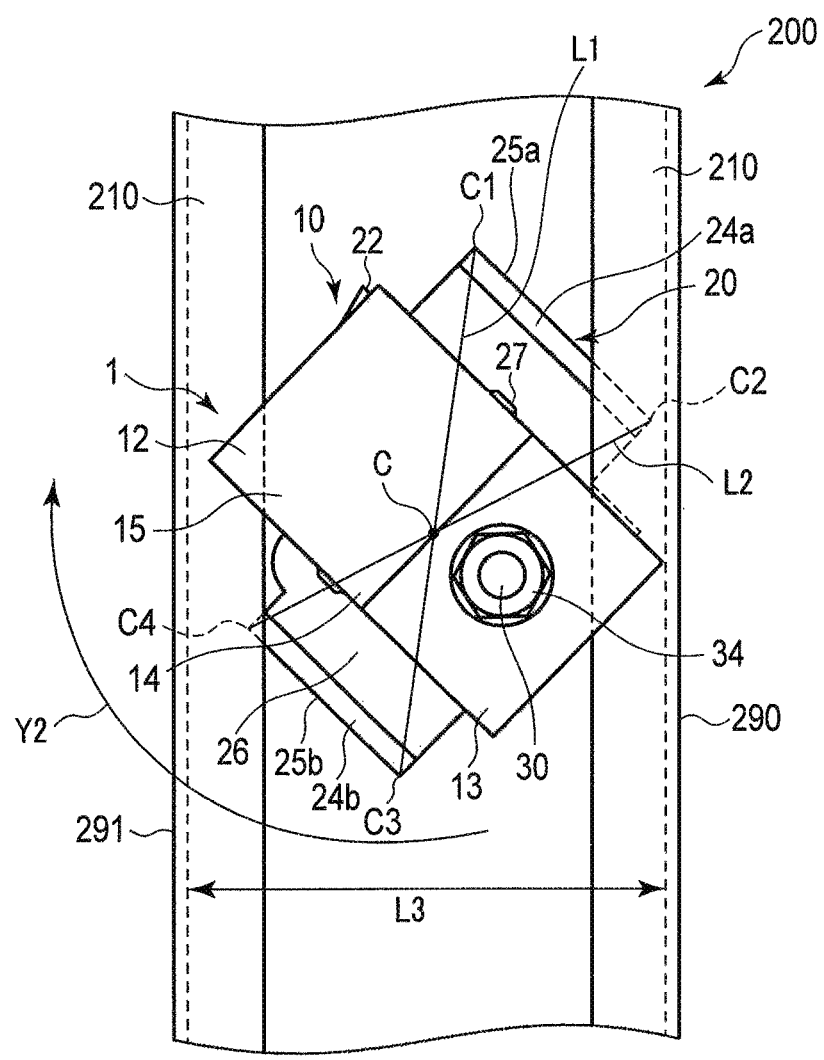
F I G. 11

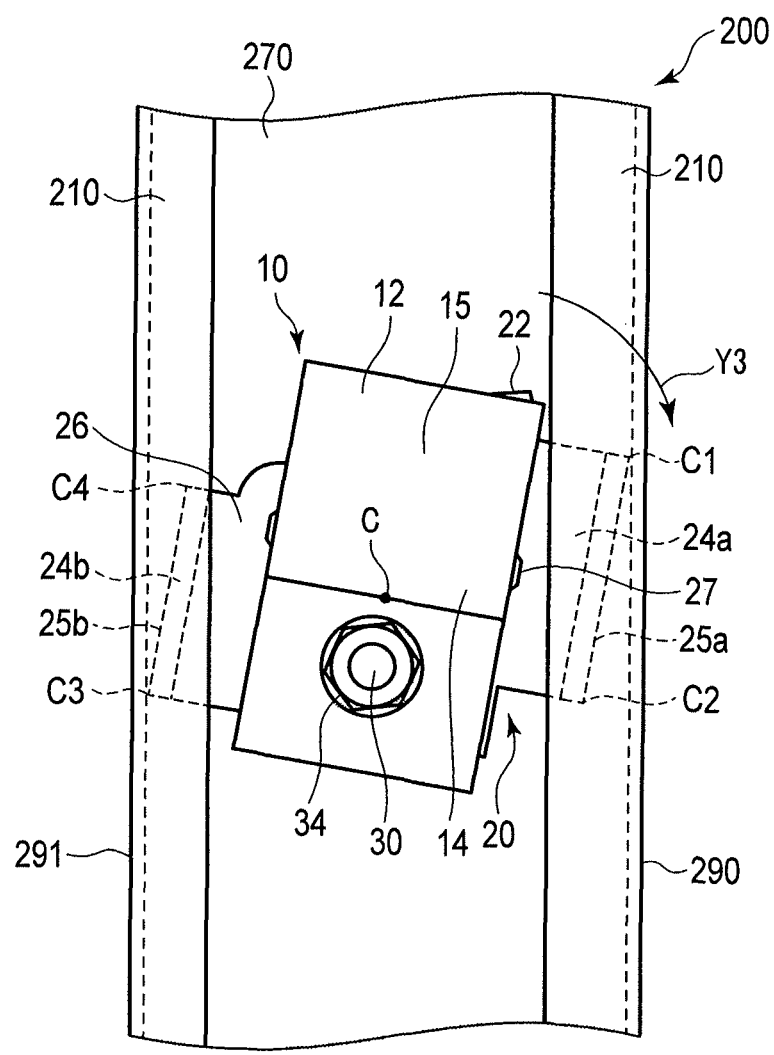
F I G. 14

PANEL FIXING DEVICE AND PANEL INSTALLATION METHOD

CROSS-REFERENCE TO RELATED APPLICATIONS

This application is a Continuation Application of PCT Application No PCT/JP2016/075876, filed Sep. 2, 2016 and based upon and claiming the benefit of priority from Japanese Patent Application No. 2015-172887, filed Sep. 2, 2015, the entire contents of all of which are incorporated herein by reference.

FIELD

Embodiments described herein relate generally to a panel fixing device and a panel installation method using this fixing device.

BACKGROUND

Conventionally, for example, in a case of installing a plate-like panel of a solar module, etc., on a roof, first, a rail-like rack member serving as a frame would be fixed along a slope of the roof between the cave and the ridge. Here, the rack member, for example, is in a hollow rod-like shape and has a slit-like opening extending along a longitudinal direction on an upper surface portion.

The panel is then arranged in order on the rack member fixed on the roof, and is fixed on the rack member by a fixing device. The fixing device for fixing this panel on the rack member is inserted from an end of the rack member, is slid to a position where the panel is to be fixed, and fixes the panel. Therefore, the panel and the fixing device need to be arranged alternately on the rack member.

In the above manner, a conventional fixing device had to be inserted from the end of the rack member and slid to a position where the panel is to be fixed. Therefore, there was a problem that the conventional fixing device had poor workability in the case of mounting and replacing the panel (Jpn. Pat. Appln. KOKAI Publication No. 2013-87579).

Therefore, the object of the present invention is to provide a panel fixing device that has good panel mounting workability, and a panel installation method using such fixing device.

BRIEF DESCRIPTION OF THE DRAWINGS

FIG. 11 is a plane view showing a state in which the fixing device of FIG. 10 is being rotated in an arrow Y2 direction.

FIG. 14 is a plane view showing a state in which the fixing device of FIG. 12 is further rotated in an arrow Y3 direction.

DETAILED DESCRIPTION

A fixing device according to a present invention comprises a pressing tool that abuts a part of a peripheral portion of a panel that is arranged on an upper surface portion of a hollow rod-like rack member that has, on the upper surface portion, a slit-like opening portion extending along a longitudinal direction, a fixing tool that abuts a back surface of the upper surface portion, the fixing tool configured insertable to the opening portion, and having in one direction a width wider than a width in a direction orthogonal to a longitudinal direction of the opening portion, and a fastening member that integrally fixes the pressing tool and the fixing tool that abut a part of the peripheral portion of the panel and the back surface of the upper surface portion of the rack member, respectively.

An installation method of the panel according to the present invention comprises: inserting from an opening portion a fixing tool that is fixed integrally with a pressing tool by a fastening member, the pressing tool abutting a part of a peripheral portion of a panel that is arranged on an upper surface portion of a hollow rod-like rack member that comprises, on the upper surface portion, a slit-like opening portion extending along a longitudinal direction, and the fixing tool abutting a back surface of the upper surface portion, and having in one direction a width wider than a width in a direction orthogonal to a longitudinal direction of the opening portion; rotating the fixing tool so that the one direction of the fixing tool is rotated in a direction along a direction orthogonal to a longitudinal direction of the rack member; arranging a part of the peripheral portion of the panel between the pressing tool and the upper surface portion of the rack member; and connecting the pressing tool and the fixing tool integrally by the fastening member.

Hereinafter, a fixing device 1 according to an embodiment of the present invention, and a solar power generation unit 600 using the fixing device 1 will be explained.

Figure 1:
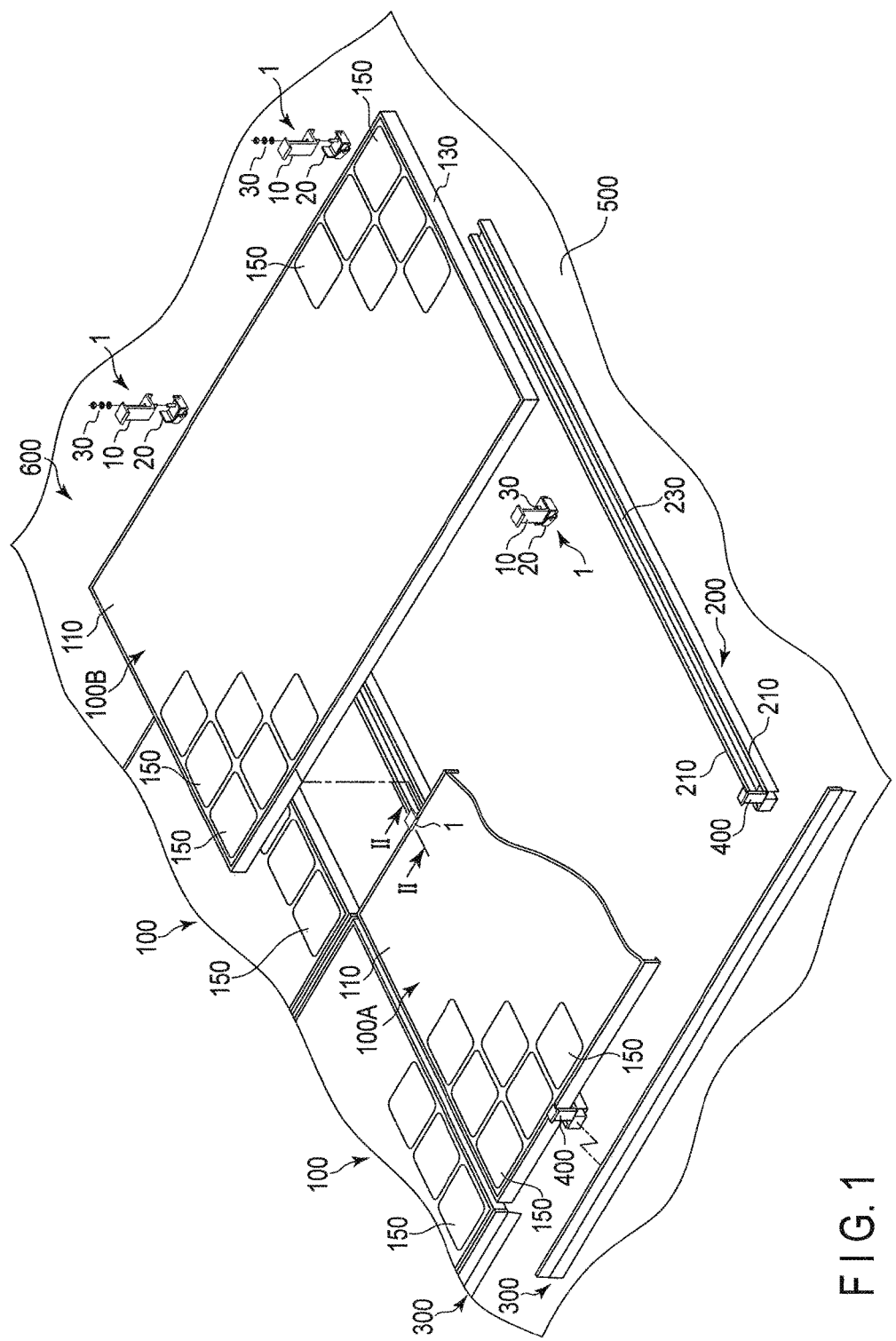
FIG. 1 is a disassembled perspective view showing a fixing device according to a present embodiment for fixing a solar module on a roof.
Figure 2:
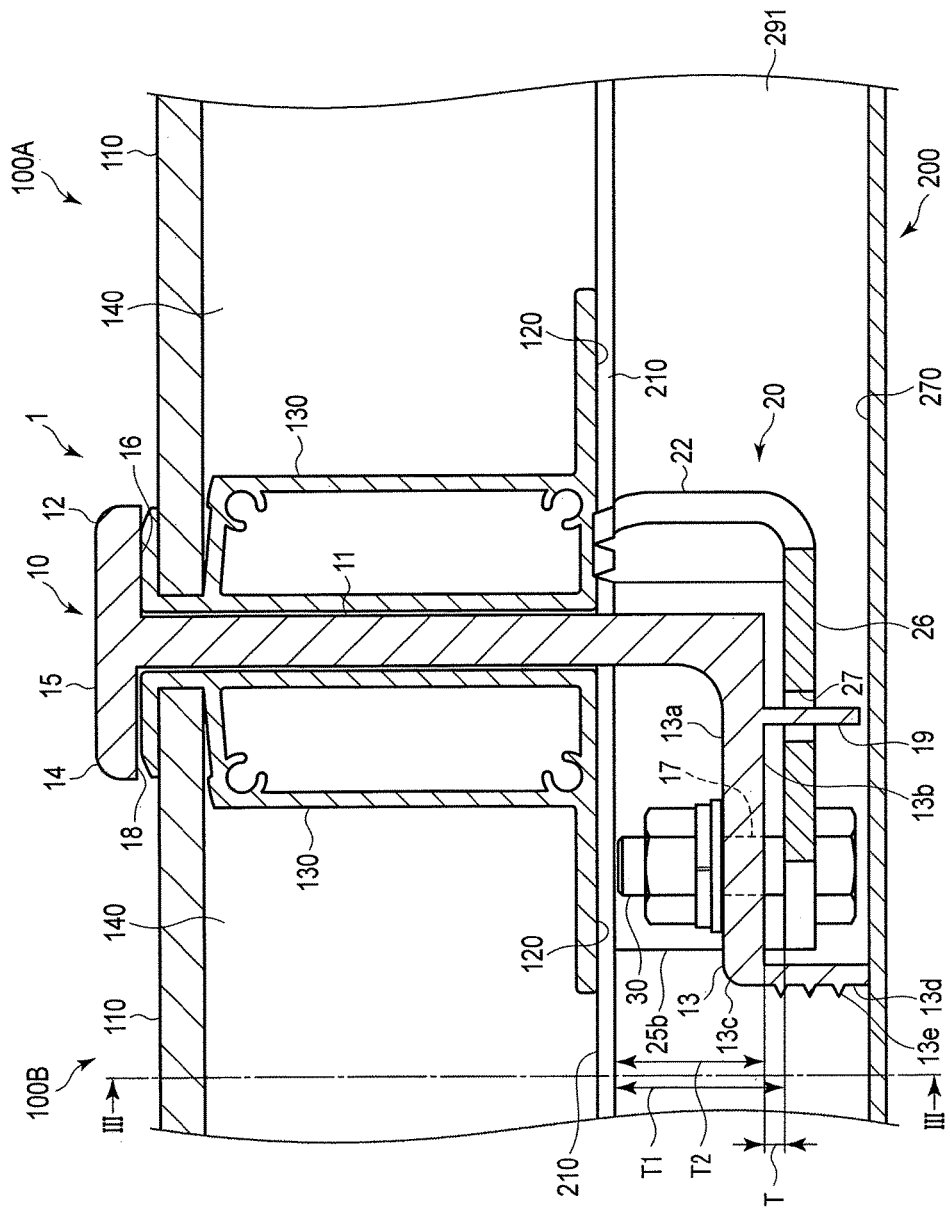
FIG. 2 is a partial cross-sectional view showing configurations of the fixing device, the solar module, and a rack member according to the present embodiment taken along a cross section line II-II in FIG. 1.
Figure 3:
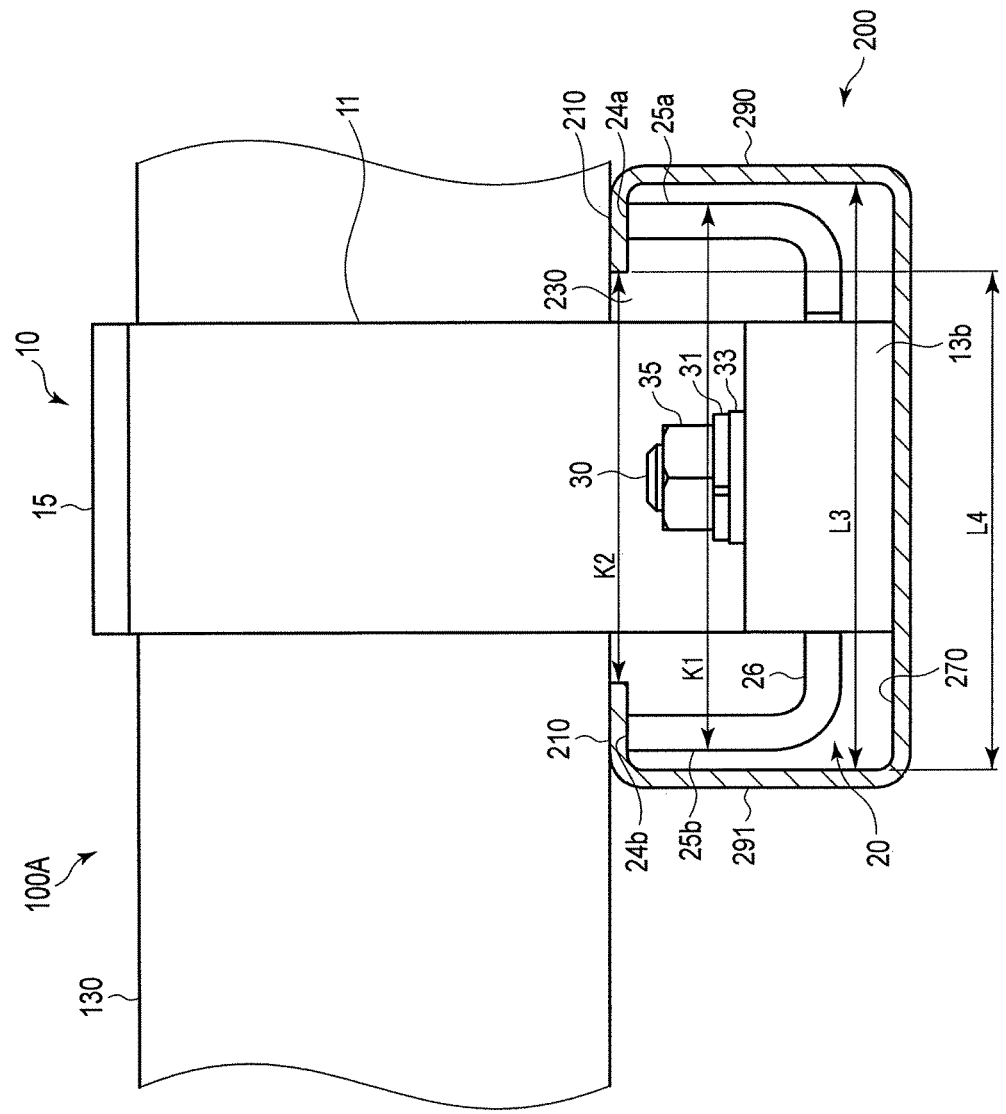
FIG. 3 is a partial cross-sectional view showing configurations of the fixing device, the solar module, and the rack member according to the present embodiment taken along a cross section line in FIG. 2.
Figure 4:
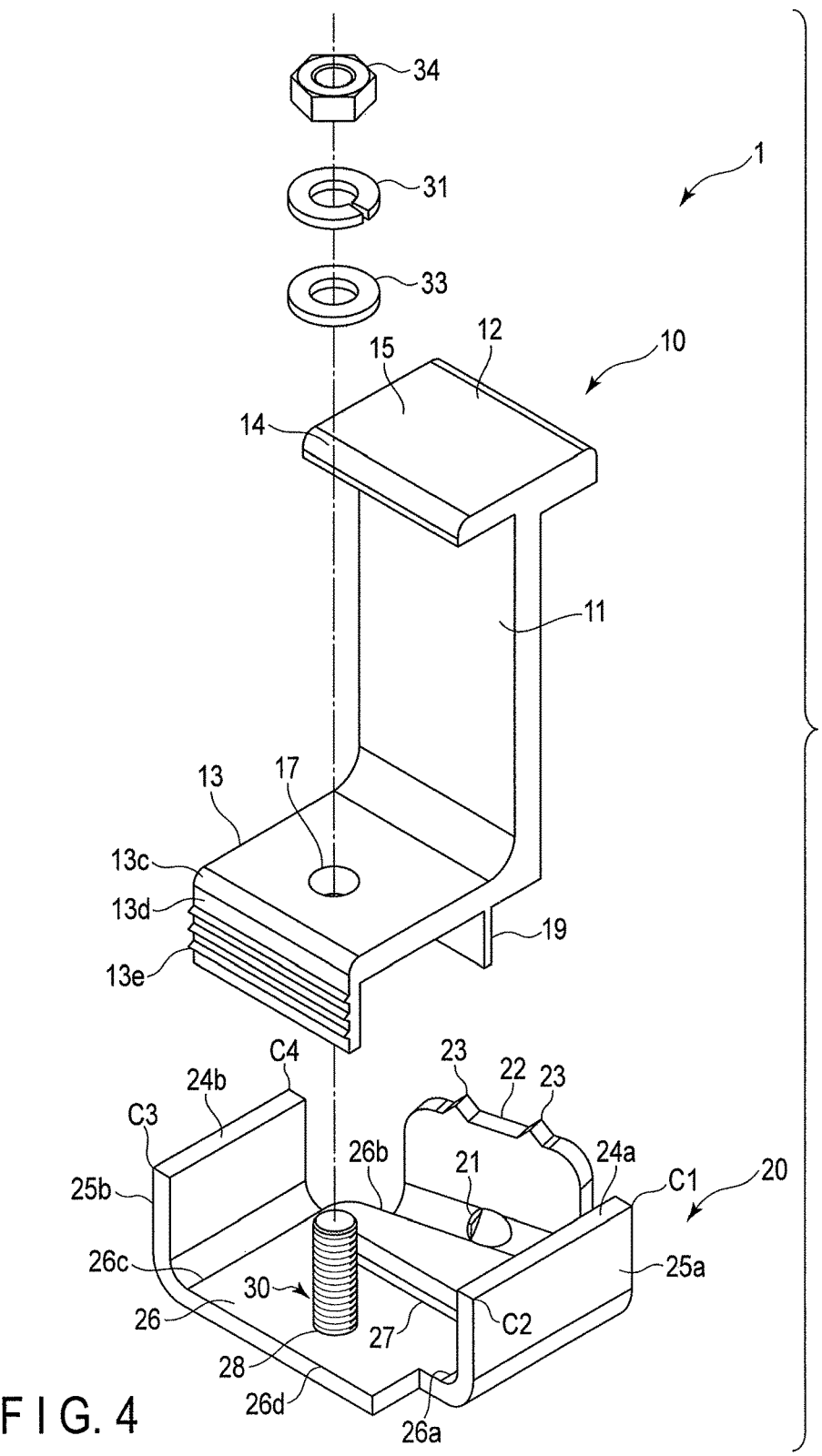
FIG. 4 is a disassembled perspective view showing the fixing device according to the present embodiment.

FIG. 1 is a disassembled perspective view showing a state in which a solar module 100 is fixed on a roof 500 of a building. FIG. 2 is a cross-sectional view showing configurations of the fixing device 1, the solar module 100, and a rack member 200 taken along a cross section line II-II in FIG. 1. FIG. 3 is a partial cross-sectional view showing configurations of the fixing device 1, the solar module 100, and the rack member 200 taken along a cross section line in FIG. 2. FIG. 4 is a disassembled perspective view showing a configuration of the fixing device 1.

The fixing device 1 is configured to be capable of fixing the solar module 100 on the rack member 200 when installing the solar power generation unit 600 on the roof 500. Here, as shown in FIG. 1, the solar power generation unit 600 comprises a plurality of solar modules 100, a plurality of rack members 200, a plurality of fixing devices 1, a plurality of decorative plates 300, and a plurality of fixing fittings 400. In the present embodiment, explanations will be provided by using the solar power generation unit 600 in which a plurality of solar modules 100 are installed along the slope of the roof 500 between the ridge and the eave of the roof 500. The eave of the roof 500 is, for example, on a side where the decorative plates 300 are provided on the roof 500 in FIG. 1.

The solar module 100 has a panel-like shape. The solar module 100 to be fixed to the rack member 200 first will be referred to as a first solar module 100A, and a solar module to be arranged on the rack member 200 next will be referred to as a second solar module 100B. Alternatively, the two sheets of the first solar module 100A and the second solar module 100B will be collectively referred to as the solar module 100. The solar module 100 includes a so-called solar panel for solar power generation and a module for a solar-powered hot-water heater that supplies hot water by utilizing the heat of the sun.

As shown in FIG. 1, the solar module 100 comprises a rectangular form frame 130 and a plurality of solar battery cells 150. The solar module 100 has a flat plate-like appearance. As shown in FIG. 2, the frame 130 covers a peripheral portion and a part of a top or a back surface of a plurality of aligned solar battery cells. The solar battery cells 150 are aligned and fixed panel-like, and supported by the frame 130. The solar module 100 has a space 140 inside the frame 130 and on a back surface side of the solar battery cell 150. Furthermore, plating is applied on the frame 130.

As shown in FIG. 1, the rack member 200 is a metallic rod-like member that is fixed on the roof 500 along the ridge to the eave of the roof 500 on which the solar module 100 is arranged. In the case of aligning the solar modules 100 in a row, for example, two rack members 200 are used. In other words, as shown in FIG. 1, for example, the solar modules 100 are supported by two rack members 200 fixed almost in parallel on the roof 500. A plurality of rack members 200 are arranged almost in parallel on the roof 500. The rack member 200 is, for example, configured in a length that is able to mount a plurality of two solar modules 100 along a longitudinal direction.

On an upper surface portion, the rack member 200 has a pair of supporting plate portions 210 that comes in contact with a back surface 120 of the frame 130 of the solar module 100, and that extends along a direction in which the solar module 100 is aligned. The rack member 200 includes a slit-like opening portion 230 between the pair of supporting plate portions 210 extending along a longitudinal direction. The rack member 200 is in a hollow rod-like shape in which the supporting plate portions 210 are formed continuously on opposite sides of the opening portion 230. That is, the rack member 200 is configured in a rectangular cylindrical shape with the slit-like opening portion 230 on its upper surface portion extending along the longitudinal direction of the rack member 200.

Specifically, as shown in FIG. 3, the rack member 200 comprises a pair of strip-like supporting plate portions 210, a bottom plate portion 270 that is isolated from and approximately parallel with the supporting plate portions 210, and a first side plate portion 290 and a second side plate portion 291 that form a pair of side plate portions integrally connecting the pair of supporting plate portions 210 and the bottom plate portion 270. In other words, as shown in FIG. 3, the rack member 200 comprises the first side plate portion 290 and the second side plate portion 291 that extend approximately vertically from two sides facing each other on the bottom plate portion 270, to be connected respectively to the pair of supporting plate portions 210. As a material of the rack member 200, for example, metal materials, such as aluminum, stainless steel, and iron, or a resin material can be used. In the present embodiment, the rack member 200 is prepared by bending a metallic rectangular plate that is elongated in one direction at a plurality of portions along a longitudinal direction.

As shown in FIG. 1 and FIG. 2, the fixing device 1, for example, is arranged between the first solar module 100A and the second solar module 100B of the rack member 200, and fixes the first solar module 100A on the rack member 200. As shown in FIG. 1 and FIG. 2, the fixing device 1 is also arranged on a ridge side of the second solar module 100B of the rack member 200, and fixes the second solar module 100B on the rack member 200.

As shown in FIG. 2, such fixing device 1 comprises a pressing tool 10, a fixing tool 20, and a bolt 30 (fastening member).

As shown in FIG. 2, the pressing tool 10 comprises a first extending portion 11, a pressing portion 15, a second extending portion 13, and a projecting portion 19. In the pressing tool 10, the first extending portion 11, the pressing portion 15, the second extending portion 13, and the projecting portion 19 are formed integrally.

The first extending portion 11 is configured in a rectangular plate-like shape. The first extending portion 11 is a part of the pressing tool 10 in a rectangular plate-like shape extending along a thickness direction of the frame 130 of the solar module 100, that is, a direction orthogonal to the upper surface of the roof 500, when the pressing tool 10 is arranged on the rack member 200. Specifically, the first extending portion 11 is configured in a manner that the length in the longitudinal direction is made longer than a height from an end portion of the frame 130 on the back surface 120 side of the solar module 100 to an end portion of the frame 130 on the upper surface 110 side of the solar module 100. Specifically, the length of the first extending portion 11 in the longitudinal direction is longer than the thickness of the solar module 100, and a part thereof is inserted through the inner side of the rack member 200 from the opening portion 230 of the rack member 200. The length of the first extending portion 11 is not limited to that presented in the present embodiment. That is, the length of the first extending portion 11 is set in accordance with the thickness of the solar module 100 and the shapes of the second extending portion 13 and the projecting portion 19.

The first extending portion 11 is formed so that a length in the width direction orthogonal to the longitudinal direction of the first extending portion 11 at a surface facing the side surface of the frame 130 is made shorter than a length in the width direction of the opening portion 230 that is orthogonal to the longitudinal direction of the rack member 200. Furthermore, in accordance with the material and shape of the pressing tool 10, the thickness of first extending portion 11 that is orthogonal to the longitudinal direction and the width direction is set strong enough to support the solar module 100.

As shown in FIG. 2, the pressing portion 15 is one end of the first extending portion 11, and is extended along the thickness direction of the first extending portion 11. As shown in FIG. 2, the pressing portion 15 is a part provided integrally with the first extending portion 11 at the upper end of the illustration of the first extending portion 11, and arranged along a surface that is approximately orthogonal to the longitudinal direction of the first extending portion 11. The pressing portion 15 includes a first pressing portion 12 and a second pressing portion 14. The first pressing portion 12 abuts a part of a peripheral portion of the first solar module 100A. Specifically, the first pressing portion 12 engages with the upper surface of the frame 130 on the surface 110 side of the first solar module 100A. The second pressing portion 14 abuts a part of a peripheral portion of the second solar module 100B. Specifically, the second pressing portion 14 faces the upper surface of the frame 130 on the surface 110 side of the second solar module 100B, and prevents the second solar module 100B from becoming disengaged with the fixing device 1. The first pressing portion 12 is made slightly thicker than the second pressing portion 14. In other words, the distance from a contact surface 18 of the second pressing portion 14 of the pressing tool 10 to the surface (outer surface) of the supporting plate portion 210 is configured slightly longer than the distance from a contact surface 16 of the first pressing portion 12 to the surface of the supporting plate portion 210.

In other words, the distance between the contact surface 18 of the second pressing portion 14 and a surface 13a of the second extending portion 13 is configured longer than the distance between the contact surface 16 of the first pressing portion 12 and the surface 13a of the second extending portion 13.

In the above manner, the first solar module 100A positioned on the eave side is strongly fixed by the first pressing portion 12. On the other hand, the second solar module 100B arranged on the ridge side may be easily inserted under the second pressing portion 14.

That is, when fitting the second solar module 100B between the contact surface 18 of the second pressing portion 14 and the supporting plate portion 210 after fixing the first solar module 100A by using the fixing device 1, it is possible to fit the second solar module 100B into the fixing device 1 diagonally from above. Therefore, since there is no need to slide the second solar module 100B along the supporting plate portion 210, favorable workability is obtained.

The second extending portion 13 is provided at an end on the opposite side of the end at which the pressing portion 15 of the first extending portion 11 is provided, and extends in the thickness direction of the first extending portion 11. The width of the second extending portion 13 is, for example, configured to be the same width as the first extending portion 11. The second extending portion 13 is a plate-like portion that extends integrally from an end portion on the opposite side of the pressing portion 15 of the first extending portion 11, in an approximately parallel manner with the supporting plate portion 210 of the rack member 200. In other words, the second extending portion 13 is a portion that is almost orthogonal to the first extending portion 11, and is extended approximately in parallel with the second pressing portion 14 from the other end portion of the first extending portion 11.

As shown in FIG. 2 and FIG. 3, the second extending portion 13 has, for example, a first bolt hole 17 at a position that does not overlap with the second pressing portion 14. The first bolt hole 17 penetrates the second extending portion 13. An axial direction of the first bolt hole 17 is orthogonal to the second extending portion 13. The first bolt hole 17 has an inner diameter into which the bolt 30 can be inserted to connect the pressing tool 10 and the fixing tool 20.

The second extending portion 13 is formed integrally with an end portion 13c, and has a leg portion 13d that extends from a back surface 13b side of the second extending portion 13 along the longitudinal direction of the first extending portion 11. Specifically, as shown in FIG. 2, at the end portion 13c on the opposite side of the side that is connected to the first extending portion 11 of the second extending portion 13, the leg portion 13b that extends towards the bottom plate portion 270 of the rack member 200 is provided integrally.

The projecting portion 19 is formed integrally with the second extending portion 13. As shown in FIG. 2, the projecting portion 19 is a rectangular plate-like portion that extends from the back surface 13b on the first extending portion 11 side of the second extending portion 13 towards the bottom plate portion 270 of the rack member 200. The projecting portion 19 is inserted through a connection hole 27 of the fixing tool 20 mentioned later on. In the present embodiment, the projecting portion 19 has a plate-like shape and is inserted through the slit-like connection hole 27. By inserting the projecting portion 19 through the connection hole 27, for example, when the pressing tool 10 is rotated in the arrow Y2 direction of FIG. 11, the pressing tool 10 would not be detached from the fixing tool 20. That is, the projecting portion 19 and the connection hole 27 control the shift of the fixing tool 20 in the arrow Y2 direction with respect to the pressing tool 10. In other words, when the pressing tool 10 is rotated about an axis along a protruding direction of the projecting portion 19, the fixing tool 20 rotates together with the pressing tool 10.

In the present embodiment, the shape of the projecting portion 19 is plate-like. However, the shape of the projecting portion 19 is not limited to this, and may be other shapes as long as it is able to control shifting the fixing tool 20 in the arrow Y2 direction with respect to the pressing tool 10 without being shifted together with the pressing tool 10.

Furthermore, when, for example, force is applied from the ridge side to the eave side on the solar module 100, the projecting portion 19 abuts the rack member 200 and functions as a supporting member for supporting the solar module 100.

The leg portion 13d extends from the end portion 13c of the second extending portion 13 to a direction orthogonal to the longitudinal direction of the second extending portion 13. The leg portion 13d is extended and formed in a direction isolated from the second pressing portion 14. In other words, the leg portion 13d is extended in the same direction as the projecting portion 19 at the end portion of the second extending portion 13. The leg portion 13d is formed longer than the length of the projecting portion 19 in the protruding direction. The leg portion 13d is configured in a length that would abut the bottom plate portion 270 of the rack member 200 when the fixing device 1 fixes the solar module 100 on the rack member 200.

In the present embodiment, the leg portion 13d is a plate-like portion that is provided approximately in parallel with the projecting portion 19, and approximately orthogonal to the second extending portion 13. The leg portion 13d has a plurality of convex portions 13e on a surface of a side isolated from the projecting portion 19. In other words, the leg portion 13d has the convex portions 13e on a surface continuous with the surface 13a of the second extending portion 13.

Since such leg portion 13d allows the distal end of the leg portion 13d to abut the bottom plate portion 270 of the rack member 200, when a force from the eave side towards the ridge side is applied on the solar module 100, the fixing device 1 is able to act against the force from the eave side towards the ridge side.

For example, when a strong wind blows from the eave side towards the ridge side, the first solar module 100A shown in FIG. 2 is depressed towards the second solar module 100B. Here, the leg portion 13d abuts the bottom plate portion 270 of the rack member 200 to prevent the fixing device 1 from being damaged, as well as to support the first solar module 100A.

Furthermore, by being comprised of the leg portion 13d and the projecting portion 19, the pressing tool 10 is configured in a self-sustainable manner. Therefore, favorable workability may be obtained since an operator would be able to temporarily place the fixing device 1 standing inside the rack member 200.

The plurality of convex portions 13e provided on the leg portion 13d also function as an identification mark. For example, in the case of manufacturing a variety of types of pressing tools 10 in which the lengths of the first extending portions 11 are different, the number of convex portions 13e may be changed in accordance with the length of the first extending portion 11 so that each of the pressing tools 10 having different lengths of the first extending portion 11 can be easily distinguished.

Furthermore, in the present embodiment, the pressing portion 15, the first extending portion 11, the second extending portion 13, the projecting portion 19, and the leg portion 13d that configure the pressing tool 10 are formed integrally by extrusion.

Now, the fixing tool 20 will be explained using FIG. 2 to FIG. 4. As shown in FIG. 4, the fixing tool 20 comprises a base portion 26, a first pressure contact portion 25a, a second pressure contact portion 25b, and a grounding portion 22.

As shown in FIG. 3 and FIG. 4, the base portion 26 is, for example, a square plate-like portion, and an approximately trapezoidal portion comprising a first side 26a, a second side 26b, a third side 26c, and a fourth side 26d. At the first side 26a and the third side 26c, the base portion 26 is integrally connected to each of the first pressure contact portion 25a and the second pressure contact portion 25b. The base portion 26 is integrally connected with the grounding portion 22 at the second side 26b.

The base portion 26 comprises the above-mentioned connection hole 27 and a second bolt hole 28. The connection hole 27 is, for example, a slit-like through-hole that fits with the projecting portion 19 of the pressing tool 10. The shape of the connection hole 27 is changed as appropriate in accordance with the shape of the projecting portion 19. The second bolt hole 28 is a through-hole that is arranged co-axially with the first bolt hole 17 of the pressing tool 10. The second bolt hole 28 is configured so that the bolt 30 is insertable.

As shown in FIG. 3 and FIG. 4, the first pressure contact portion 25a is a wall portion that extends integrally from the first side 26a of the base portion 26 towards the supporting plate portion 210 in a direction approximately orthogonal to the base portion 26. In other words, the first pressure contact portion 25a is a wall portion that is provided along the first side plate portion 290 of the rack member 200 from the first side 26a of the base portion 26. The first pressure contact portion 25a has on its distal end a first end surface 24a that is formed abuttable with the back surface of the supporting plate portion 210. Furthermore, as shown in FIG. 11, the distal end of the first pressure contact portion 25a has a first corner C1 and a second corner C2. Here, the first corner C1 and the second corner C2 are two ridge parts configured on the outer side of the first pressure contact portion 25a.

As shown in FIG. 3 and FIG. 4, the second pressure contact portion 25b is a wall portion that extends integrally from the third side 26c of the base portion 26 towards the supporting plate portion 210 in a direction approximately orthogonal to the base portion 26. In other words, the second pressure contact portion 25b is a wall portion that is provided along the second side plate portion 291 of the rack member 200 from an end portion that includes the third side 26c of the base portion 26. The second pressure contact portion 25b has on its distal end a second end surface 24b that is formed abuttable with the back surface of the supporting plate portion 210. The second pressure contact portion 25b is provided facing the first pressure contact portion 25a in parallel. Furthermore, as shown in FIG. 11, the distal end of the second pressure contact portion 25b has a third corner C3 and a fourth corner C4. Here, the third corner C3 and the fourth corner C4 are two ridge parts configured on the outer side of the second pressure contact portion 25b.

As the pressing tool 10 and the fixing tool 20 become fastened by the bolt 30, the first pressure contact portion 25a and the second pressure contact portion 25b shift upwards towards the supporting plate portion 210 of the rack member 200. In this manner, the distal ends of the first pressure contact portion 25a and the second pressure contact portion 25b abut the back surface of the supporting plate portion 210. Specifically, the first end surface 24a of the first pressure contact portion 25a and the second end surface 24b of the second pressure contact portion 25b abut the back surface of the supporting plate portion 210.

The first pressure contact portion 25a and the second pressure contact portion 25b are spaced apart by a predetermined distance and provided on the base portion 26. Specifically, as shown in FIG. 3, a distance K1 between an outer surface of the first pressure contact portion 25a and an outer surface of the second pressure contact portion 25b of the fixing tool 20 is longer than a distance K2 in a transverse direction of the opening portion 230 of the rack member 200. Furthermore, the distance K1 is shorter than a distance L3 between an inner surface of the first side plate portion 290 and an inner surface of the second side plate portion 291 of the rack member 200. Therefore, when the fixing tool 20 arranged inside the rack member 200 is at a position where the first pressure contact portion 25a and the second pressure contact portion 25b are abuttable against the back surface of the supporting plate portion 210, the fixing tool 20 would not become detached from the opening portion 230 to the outer side of the rack member 200. Therefore, a greater width of a contactable region of the pair of supporting plate portions 210 and the first pressure contact portion 25a and the second pressure contact portion 25b can be made. That is, by increasing a contact area of the fixing tool 20 and the rack member 200, friction can be increased to achieve stronger fixation. Furthermore, the distance K1 is longer than a distance L4 between the inner surface of the second side plate 291 and an end portion of the supporting plate portion 210 (edge of the opening portion 230) on the first side plate portion 290 side. Therefore, even if the position of the fixing tool 20 is shifted horizontally in the illustration, the fixing tool 20 would not be detached from the rack member 200.

The distance L4 is the same distance as the distance between the inner surface of the first side plate portion 290 and the end portion of the supporting plate portion 210 on the second side plate portion 291.

Furthermore, as shown in FIG. 4, the first pressure contact portion 25a and the second pressure contact portion 25b of the fixing tool 20 extend along the longitudinal direction of the rack member 200 in a state where the fixing tool 20 is attached to the rack member 200. The first pressure contact portion 25a and the second pressure contact portion 25b are arranged in parallel at positions shifted in the longitudinal direction. In other words, a part on the fourth side 26d of the first pressure contact portion 25a is cut out, and similarly, a part on the second side 26b of the second pressure contact portion 25b is cut out.

As shown in FIG. 11, in the present embodiment, a distance L1 between the first corner C1 and the third corner C3 is longer than a distance L2 between the second corner C2 and the fourth corner C4. Here, the distance L1 is a diagonal line that joins the first corner C1 and the third corner C3. The distance L2 is a diagonal line that joins the second corner C2 and the fourth corner C4. Therefore, the distance L1 is longer than the distance L3 between the inner surface of the first side plate portion 290 and the inner surface of the second side plate portion 291. On the other hand, the distance L2 is shorter than the distance L3.

Figure 9:
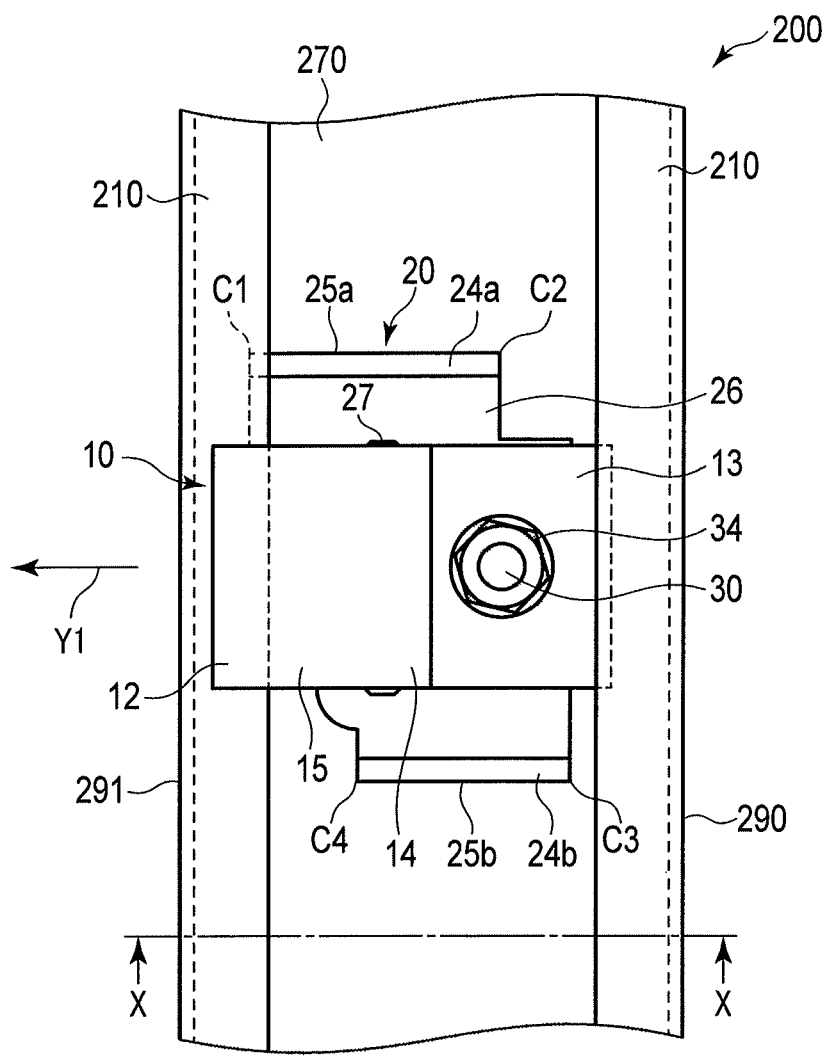
FIG. 9 is a plane view showing a state in which the fixing device that was at a position shown in FIG. 7 is shifted in an arrow Y1 direction.
Figure 12:
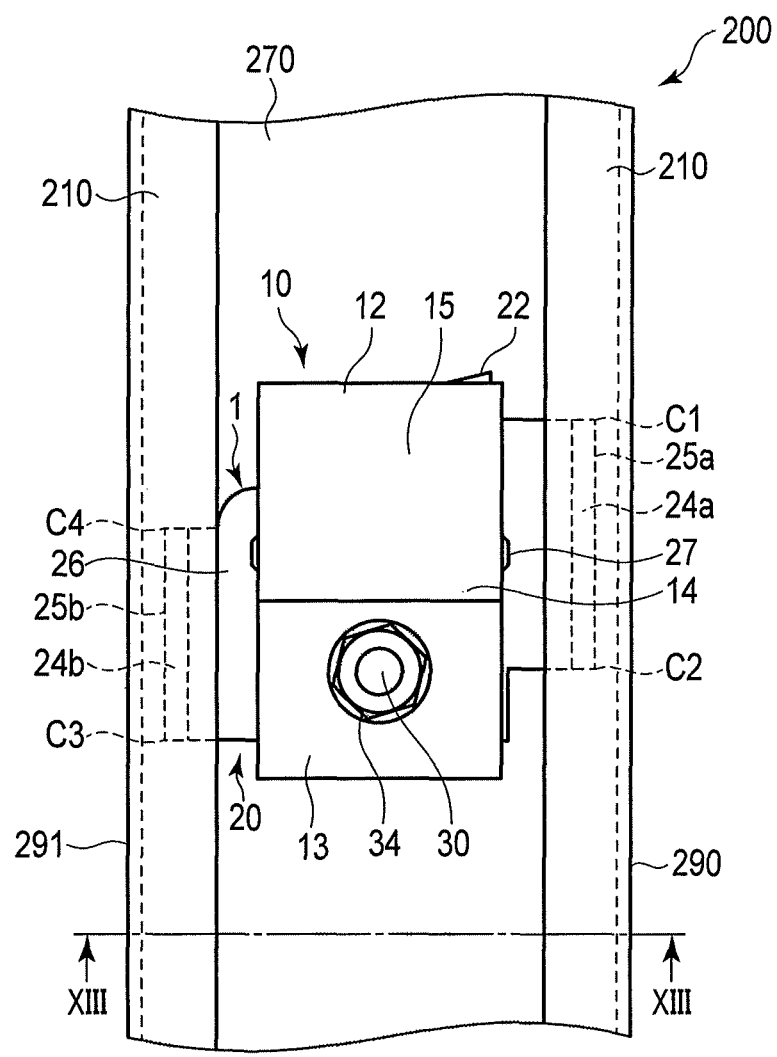
FIG. 12 is a plane view showing a state in which the fixing device of FIG. 10 is rotated approximately 90 degrees in the arrow Y2 direction.

The fixing tool 20 that has such configuration can be rotated 90 degrees in a direction shown by arrow Y2 of FIG. 11, from a state shown in FIG. 9 to a state shown in FIG. 12 inside the rack member 200. That is, the distance L2 is shorter than the distance L3. Therefore, the second corner C2 can be rotated 90 degrees in the arrow Y2 direction without coming in contact with the first side plate portion 290. The fourth corner C4 can be rotated 90 degrees in the arrow Y2 direction without coming in contact with the second side plate portion 291. The fixing tool 20 can also be rotated 90 degrees in the opposite direction of the arrow Y2 from a state shown in FIG. 12, to return to the state shown in FIG. 9. When attempting to turn the fixing tool 20 more than 90 degrees in the arrow Y2 direction, each of the first corner C1 and the third corner C3 would abut the first side plate portion 290 and the second side plate portion 291, which would disturb the rotation.

As shown in FIG. 4, the grounding portion 22 is a plate-like portion approximately orthogonal to the base portion 26 from an end portion including the second side 26b of the base portion 26, and arranged integrally extending towards the opening portion 230 of the rack member 200 in a direction that intersects the first pressure contact portion 25a and the second pressure contact portion 25b. Furthermore, the grounding portion 22 extends towards the first pressing portion 12 from the base portion 26 in a direction orthogonal to a surface direction of the base portion 26. The grounding portion 22 also extends in a direction that intersects with a direction in which the first pressure contact portion 25a extends. For example, the grounding portion 22 is provided along the second side 26b of the end portion of the base portion 26 in a tilted manner so that it faces the first extending portion 11 side rather than a direction orthogonal to the first pressure contact portion 25a. The grounding portion 22 has two protrusions 23 on its distal end side. The protrusions 23 protrude more than the first end surface 24a and the second end surface 24b towards the pressing portion 15. The protrusions 23 abut the back surface 120 of the frame 130 of the solar module 100 in the manner shown in FIG. 2 when the fixing tool 20 is fixed to the rack member 200. The protrusions 23 penetrate a plated thin film layer that is applied on the frame 130, and come in contact with a metal portion of the frame 130. In this manner, the grounding portion 22 grounds the solar module 100.

In the present embodiment, the first side 26a and the third side 26c of the base portion 26 are approximately orthogonal to the fourth side 26d. The lengths of the first side 26a and the third side 26c are different. The second side 26b that joins the first side 26a and the third side 26c intersects with the first side 26a and the third side 26c obliquely. Therefore, the grounding portion 22 provided along the second side 26b is arranged obliquely with respect to the fourth side 26d.

As shown in FIG. 4, the grounding portion 22 is configured obliquely with respect to a width direction of the first extending portion 11. The solar module 100 is, for example, fixed to the rack member 200, and is arranged in a tilted manner on the roof 500 along the tilt of the roof 500. Therefore, water flowing in the direction of the grounding portion 22 is discharged outside of the base portion 26 along the tilt of the grounding portion 22 provided on the eave side. That is, the flow of water can be created along the fourth side 26d, which prevents a water puddle from being formed on the base portion 26. Furthermore, the grounding portion 22 comprises a drain hole 21 at a portion that is connected with the base portion 26. In other words, the fixing tool 20 comprises a drain hole at a corner portion that is a portion connecting the grounding portion 22 and the base portion 26. The drain hole penetrates the corner portion in a thickness direction of the grounding portion 22, a thickness direction of the base portion 26, or a gravity direction of when the fixing tool 20 is fixed to the rack member 200. In this manner, the grounding portion 22 is further able to enhance water drainage function and prevent the base portion 26 from rusting.

As a material of the fixing tool 20, for example, metal materials such as aluminum, stainless steel, and iron, or a resin material can be used. In the present embodiment, the fixing tool 20 is prepared integrally by bending a metallic plate at a plurality of portions by press processing.

As shown in FIG. 4, the bolt 30 is inserted from beneath in the illustration of the fixing tool 20. The bolt 30 passes through the first bolt hole 17 of the pressing tool 10 that is coaxial with the second bolt hole 28, and is screwed together with a nut 34 via washers 31 and 33. In this manner, the bolt 30 fastens the pressing tool 10 and the fixing tool 20 to integrally fix the pressing tool 10 and the fixing tool 20 that respectively abut the first solar module 100A and the rack member 200.

As shown in FIG. 2, the bolt 30 fixes the pressing tool 10 and the fixing tool 20 in a state where the supporting plate portion 210 of the rack member 200 and the solar module 100 are clamped between the pressing portion 15 and the first pressure contact portion 25a and the second pressure contact portion 25b. That is, the fixing tool 20 is provided below in the illustration, and the second extending portion 13 of the pressing tool 10 is arranged accumulated on the base portion 26 of this fixing tool 20. In this state, the pressing tool 10 and the fixing tool 20 are fastened by the bolt 30.

Furthermore, as shown in FIG. 2, in a state where the first solar module 100A is fixed to the rack member 200 by the first pressing portion 12 and the first pressure contact portion 25a and the second pressure contact portion 25b, a space T is provided between the second extending portion 13 and the base portion 26. That is, as show in FIG. 2 and FIG. 3, a distance T1 between the surface of the base portion 26 and the first end surface 24a of the fixing tool 20 and the second end surface 24b of the fixing tool 20 is provided longer by the thickness of the space T than a distance T2 between the back surface 13b of the second extending portion 13 and the back surface of the supporting plate portion 210.

As shown in FIG. 2, when the bolt 30 is fastened, the pressing portion 15 of the pressing tool 10 moves downward in the illustration, and depresses the solar module 100 in a lower direction in the illustration. On the other hand, the first pressure contact portion 25a and the second pressure contact portion 25b of the fixing tool 20 moves upward in the illustration and depress the solar module 100 upward in the illustration via the supporting plate portion 210.

Here, in the case where the distance T2 is designed to be the same length as the distance T1, even in a state where the bolt 30 is completely fastened, it would be difficult to apply a force necessary for fixing the solar module 100. In contrast, by providing the space T as a so-called interference, the fixing device 1 would be able to firmly fix the solar module 100 by using the pressing tool 10 and the fixing tool 20.

In other words, from a state in which the first pressing portion 12 of the pressing portion 15 is in contact with the solar module 100, and the back surface of the supporting plate portion 210 and the first pressure contact portion 25a and the second pressure contact portion 25b abut each other, the fixing device 1 is able to further fasten the bolt 30 by the space T. The dimension of the space T is not particularly determined, however; for example, the range may be set to one to five millimeters. In the present embodiment, the dimension of the space T is set at two millimeters. If the dimension of the space T is narrower than this, a dimension error of the fixing device 1 may not allow the space T to function as the interference. On the other hand, in order to set the space T wider, a problem of space, or a problem of assembly strength between the pressing tool 10 and the fixing tool 20 may occur. Therefore, the dimension of the space T is decided as appropriate by considering the size of the fixing device 1 and the size of the rack member 200.

The decorative plate 300 covers the end surface of the eave side of the first solar module 100A, the end surface of the eave side of the rack member 200, and the eave side of the fixing fitting 400. For example, the decorative plate 300 is configured so that a part thereof can be fitted into the fixing fitting 400.

The fixing fitting 400 is provided on the distal portion along the eave of the rack member 200, and fixes the edge on the eave side of the first solar module 100A.

(Installation of First Solar Module)

An installation process of the first solar module 100A and the second solar module 100B using the fixing device 1 according to the present embodiment will be explained.

First of all, as shown in FIG. 1, an operator fixes the rack member 200 for mounting the solar module 100 to the roof 500. The operator then attaches the fixing fitting 400 to the distal end portion on the eave side of the rack member 200. Here, when attaching the fixing fitting 400, the operator fits and fixes the decorative plate 300 onto the eave side of the fixing fitting 400. By providing the decorative plate 300 on the eave side of the fixing fitting 400, the fixing fitting 400 can be prevented from direct visual contact, which would retain an aesthetic appearance. The fixing fitting 400 is fixed to the bottom plate portion 270 of the rack member 200 using an unillustrated bolt.

The operator then installs the first solar module 100A on the rack member 200. In the present embodiment, the first solar module 100A is arranged bridged between two rack members 200 arranged approximately in parallel. The first solar module 100A is supported by clamping the frame 130 on the eave side between the pressing portion 15 of the fixing fitting 400 and the supporting plate portion 210 of the rack member 200.

(Fixation of First Solar Module)

First of all, the pressing tool 10 and the fixing tool 20 of the fixing device 1 are connected by the bolt 30, thereby temporary fastening the two members. Temporary fastening indicates a state in which the projecting portion 19 of the pressing tool 10 is fitted into the connection hole 27 of the fixing tool 20, and the bolt 30 and the nut 34 are fastened to an extent that the pressing tool 10 and the fixing tool 20 do not become separated from each other. By preparing the number of necessary temporarily fastened fixing devices 1 in advance, the operator would be able to effectively proceed with the installation operation of the solar module 100.

Now, the process of mounting the fixing device 1 that fixes the first solar module 100A onto the rack member 200 will be explained using FIG. 5 to FIG. 13.

Figure 5:
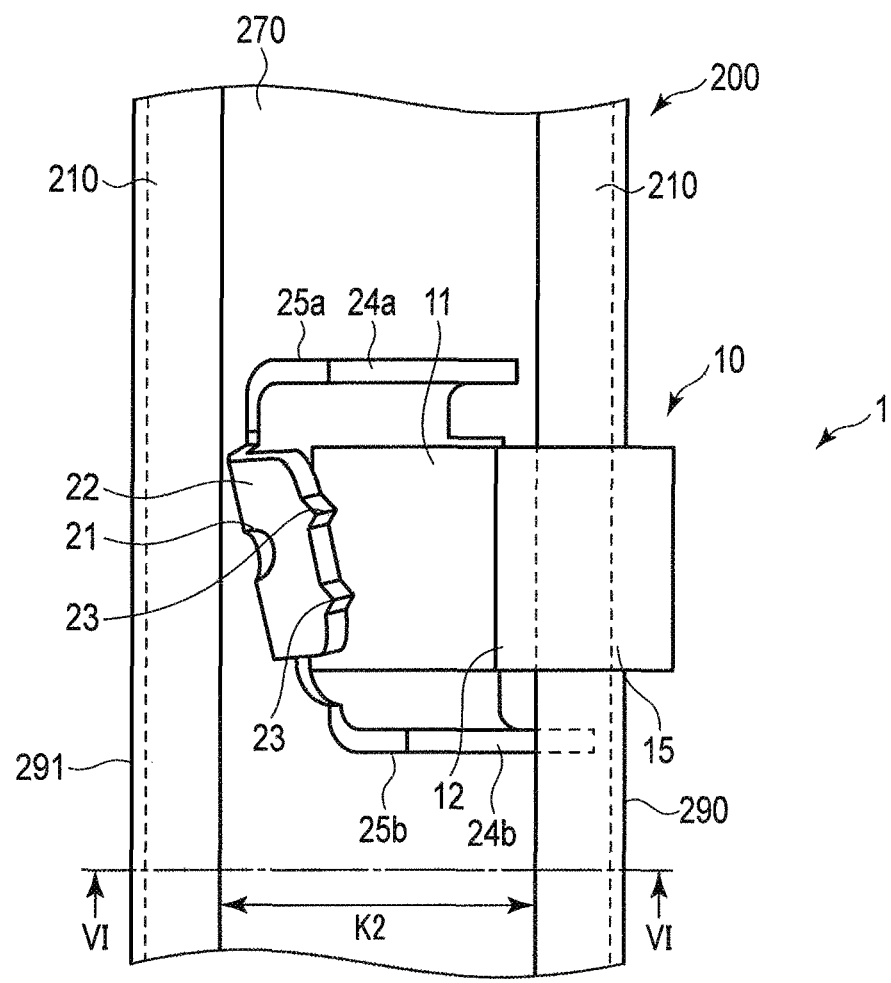
FIG. 5 is a plane view showing a state in which the fixing device according to the present embodiment is inserted into the rack member in a tilted posture.
Figure 6:
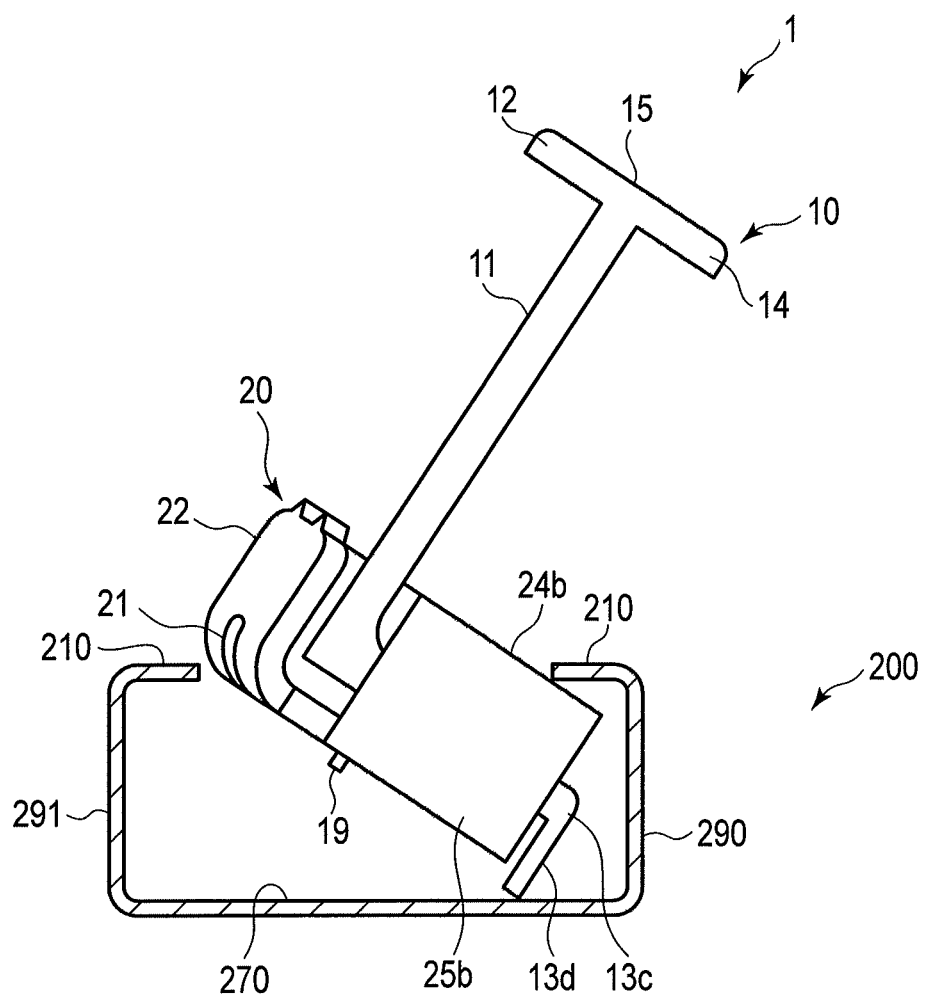
FIG. 6 is a cross-sectional view showing the fixing device shown in FIG. 5 taken along a cross section line VI-VI in FIG. 5.
Figure 7:
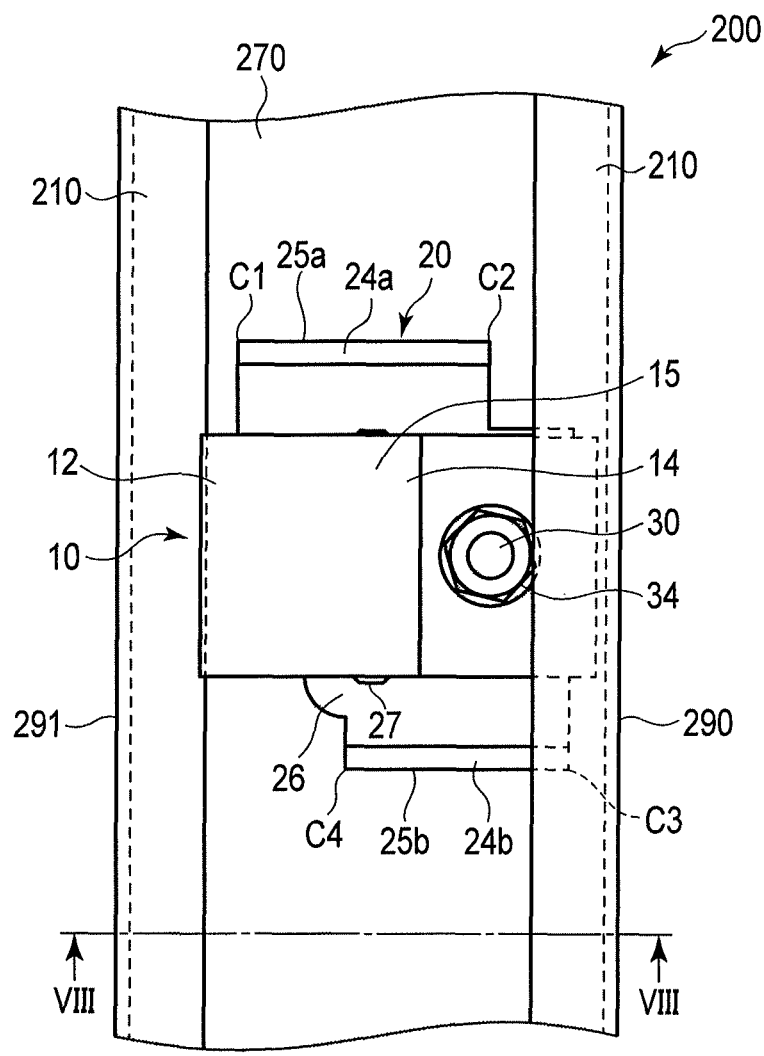
FIG. 7 is a plane view showing a state in which the fixing device according to the present embodiment is inserted inside the rack member.
Figure 8:
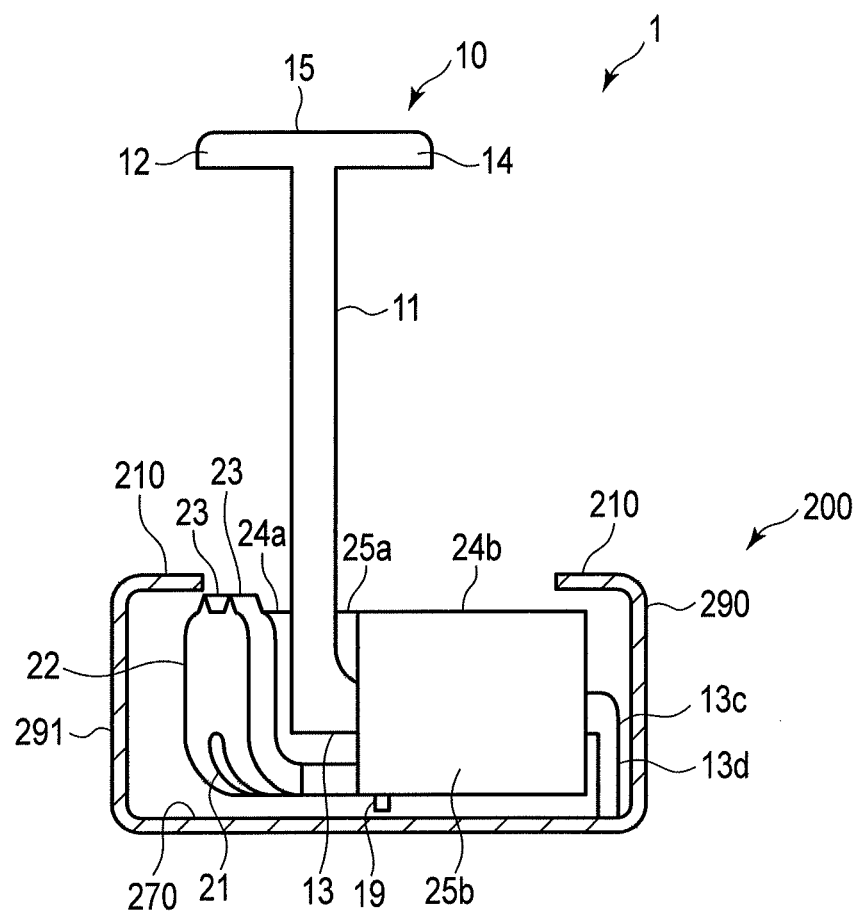
FIG. 8 is a cross-sectional view showing the fixing device shown in FIG. 7 taken along a cross section line VIII-VIII in FIG. 7.
Figure 10:
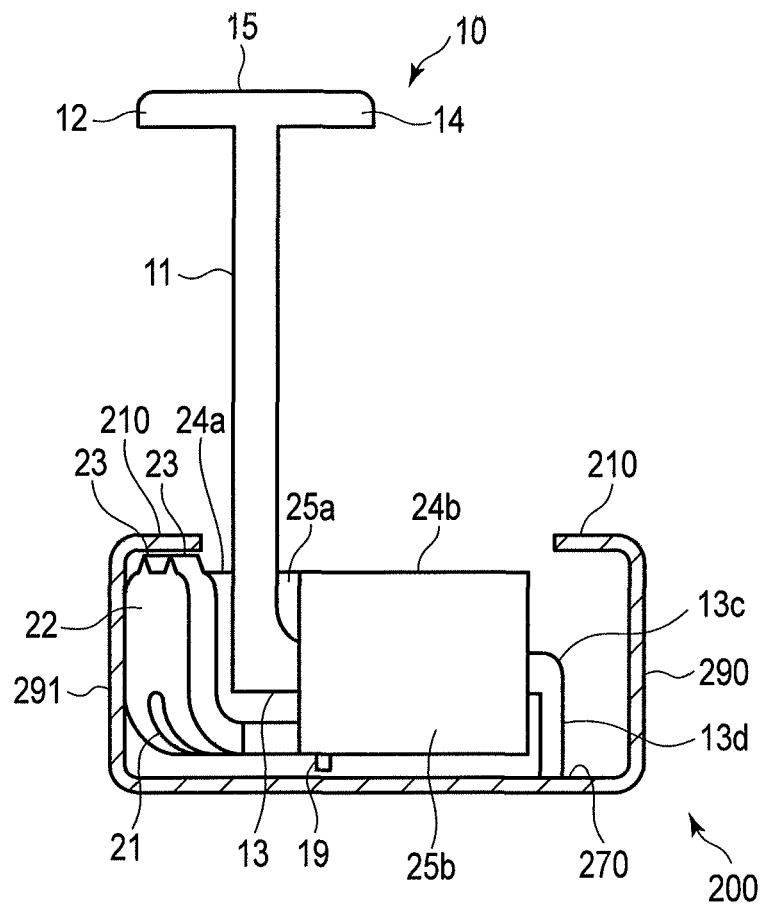
FIG. 10 is a cross-sectional view showing the fixing device of FIG. 9 taken along a cross section line X-X in FIG. 9.
Figure 13:
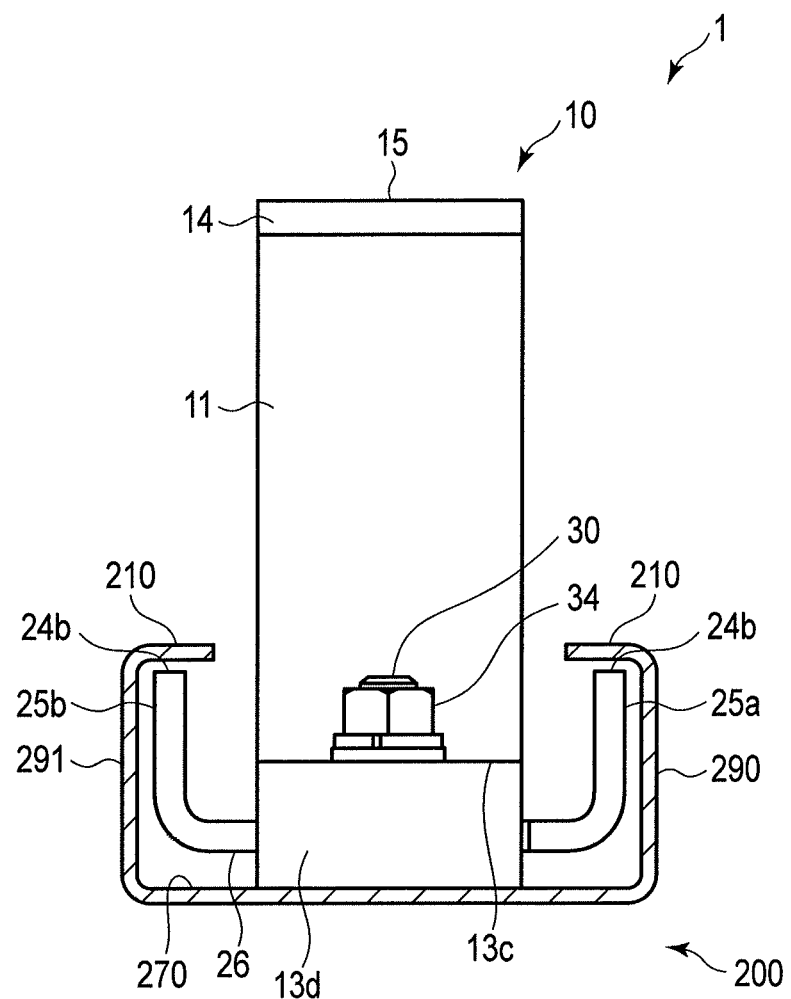
FIG. 13 is a cross-sectional view showing the fixing device of FIG. 12 taken along a cross section line XIII-XIII in FIG. 12.

FIG. 5 is a plane view showing a state in which the fixing device 1 is inserted into the rack member 200 in a tilted posture. FIG. 6 is a cross-sectional view showing the fixing device 1 shown in FIG. 5 taken along a cross section line VI-VI in FIG. 6. FIG. 7 is a plane view showing a state in which the fixing device 1 is inserted into the space of the rack member 200. FIG. 8 shows the fixing device 1 of FIG. 7 taken along a cross section line VIII-VIII in FIG. 7. FIG. 9 is a plane view showing a state in which the fixing device 1 of FIG. 7 is shifted in an arrow Y1 direction. FIG. 10 is a cross-sectional view showing the fixing device 1 of FIG. 9 taken along a cross section line X-X in FIG. 9. FIG. 11 is a plane view showing a state in which the fixing device 1 of FIG. 10 is in the process of being rotated about an intersection point C in an arrow Y2 direction. FIG. 12 is a plane view showing a state in which the fixing device 1 of FIG. 10 is rotated approximately 90 degrees. FIG. 13 is a cross-sectional view showing the fixing device 1 of FIG. 12 taken along a cross section line XIII-XIII in FIG. 12.

As shown in FIG. 1, the fixing device 1 clamps the first solar module 100A, and is provided on the opposite side of the fixing fitting 400 along the rack member 200. As shown in FIG. 5 and FIG. 6, the operator directs the temporarily fastened fixing device 1 in a direction in which the first pressure contact portion 25a and the second pressure contact portion 25b become approximately orthogonal to the longitudinal direction of the rack member 200.

This is to align the direction of the fixing device 1 in a direction that allows the fixing device 1 to pass through the width (distance K2) of the transverse direction of the opening portion 230. In other words, this is to insert the fixing tool 20 of the fixing device 1 inside the rack member 200 from the opening portion 230. That is, the width (distance K2) of the transverse direction of the opening portion 230 is formed narrower than the distance K1 between the outer surface of the first pressure contact portion 25a and the outer surface of the second pressure contact portion 25b of the fixing tool 20. Therefore, the fixing tool 20 cannot be inserted in the opening portion 230 in a position where the first pressure contact portion 25a and the second pressure contact portion 25b are parallel with the supporting plate portion 210. In other words, the fixing tool 20 in which the longitudinal direction of the first end surface 24a is directed along the longitudinal direction of the supporting plate portion 210 cannot be inserted from the opening portion 230.

Therefore, the operator makes use of the maximum difference from the grounding portion 22 of the fixing tool 20 to the leg portion 13d of the pressing tool 10 being shorter than the distance K1. That is, as shown in FIG. 6, the operator tilts the fixing device 1 towards the opening portion 230 of the rack member 200 so that the leg portion 13*d* faces downward in the illustration. For example, the operator inserts the temporarily fastened fixing device 1 into the opening portion 230 of the rack member 200 in a tilted posture. The fixing tool 20 and a part of the pressing tool 10 of the tilted fixing device 1 are inserted inside the rack member 200. The leg portion 13*d* of the inserted fixing device 1 abuts the bottom plate portion 270 of the rack member 200.

Here, the maximum distance between the leg portion 13*d* and the outer surface of the grounding portion 22 is configured to be longer than the distances K2 of the opening portion 230. However, by tilting the posture of the fixing device 1, the operator is capable of inserting a part of the fixing device 1 on the leg portion 13*d* side inside the supporting plate portion 210. The maximum distance between the leg portion 13*d* and the outer surface of the grounding portion 22 may also be configured shorter than the distance K2 so that the fixing device 1 is configured to be inserted inside the supporting plate portion 210 without having to tilt the posture thereof.

While the distal end of the leg portion 13*d* of the fixing device 1 is abutted against the bottom plate portion 270, the operator rotates the fixing device 1 in a direction where the fixing device 1 stands. In this manner, the operator is capable of inserting the entire fixing tool 20 inside the rack member 200.

In the case where it is difficult to insert the fixing device 1 even when it is tilted, the operator sways the fixing device 1 at a position where it is stuck. Since the pressing tool 10 and the fixing tool 20 of the fixing device 1 are in a temporary fastened state, a so-called slight allowance exists in the connection between the pressing tool 10 and the fixing tool 20. The operator may sway the fixing device 1 to utilize the allowance between the fixing tool 20 and the pressing tool 10 to slightly shorten the distance from the grounding portion 22 to the leg portion 13*d*, so that the fixing device 1 can be inserted inside the rack member 200.

As shown in FIG. 7 and FIG. 8, when the fixing tool 20 of the fixing device 1 is inserted into the space inside the rack member 200, the operator shifts the fixing device 1 in the arrow Y1 direction in the manner shown in FIG. 9 and FIG. 10. As shown in FIG. 10, the fixing device 1 is shifted to a position where the grounding portion 22 becomes adjacent to the second side plate portion 291 side of the rack member 200. If the fixing device 1 can be rotated without being shifted to the arrow Y1, this step can be omitted.

Subsequently, the operator grips the pressing portion 15 of the pressing tool 10 and rotates the temporarily fastened fixing device 1 in the arrow Y2 direction shown in FIG. 11.

As shown in FIG. 11, for example, the operator rotates the fixing device 1 approximately 90 degrees about the intersection point C of the fixing device 1 in the arrow Y2 direction. When the fixing device 1 has started rotating, the first corner C1, the second corner C2, the third corner C3, and the fourth corner C4, which are the four corners of the fixing tool 20, rotate, respectively. That is, the second corner C2 and the fourth corner C4 are provided on the inner side of a circle whose center is the intersection point C and that contacts the inner side of the first side plate portion 290 and the second side plate portion 291. Therefore, the fixing device 1 can rotate approximately 90 degrees in the arrow Y2 direction.

In the manner mentioned above, when the fixing device 1 is rotated approximately 90 degrees along the arrow Y2, the first pressure contact portion 25*a* and the second pressure contact portion 25*b* of the fixing device 1 are arranged at positions where they overlap with the supporting plate portion 210 along the longitudinal direction of rack member 200 as shown in FIG. 12.

In other words, the longitudinal direction of the first end surface 24*a* of the first pressure contact portion 25*a* is directed along the longitudinal direction of the supporting plate portion 210, and is arranged facing one of the supporting plate portions 210. In the same manner, the longitudinal direction of the second end surface 24*b* of the second pressure contact portion 25*b* is directed along the longitudinal direction of the supporting plate portion 210, and is arranged facing the other supporting plate portion 210.

As shown in FIG. 12 and FIG. 13, the operator confirms that the first pressure contact portion 25*a* and the second pressure contact portion 25*b* have come to positions overlapping the supporting plate portion 210, then stops rotating the fixing device 1.

When the position of the fixing device 1 is determined, the operator starts fastening the bolt 30. By fastening the bolt 30, the first pressure contact portion 25*a* and the second pressure contact portion 25*b* of the fixing tool 20 are pulled towards the supporting plate portion 210 of the rack member 200, and the first solar module 100A is pushed from the back side of the supporting plate portion 210 via the supporting plate portion 210. Simultaneously, as shown in FIG. 2, the first pressing portion 12 of the pressing tool 10 pushes the first solar module 100A from the frame 130 towards the supporting plate portion 210. In this manner, the edge on the eave side of the first solar module 100A is clamped between the first pressing portion 12 and the supporting plate portion 210, and is fixed.

Here, the grounding portion 22 of the fixing tool 20 pushes the frame 130 of the first solar module 100A. The protrusions 23 of the grounding portion 22 tear the plated thin film applied on the frame 130, and become electrically conductive with the back surface 120 of the frame 130. In the present embodiment, two protrusions 23 are formed; however, at least one of the protrusions should be conductive.

(Fixation of Second Solar Module)

The edge of the eave side of the second solar module 100B is arranged in a manner to be clamped between the second pressing portion 14 of the fixing device 1 that fixes the ridge side of the first solar module 100A and the supporting plate portion 210 of the rack member 200.

The second solar module 100B is then arranged on the rack member 200. The next fixing device 1 is set at a position facing the second solar module 100B that is interposed between the next fixing device 1 and the fixing device 1 that fixes the ridge side of the first solar module 100A. That is, the solar module 100 is arranged alternately with the fixing device 1. Since the method of attaching the fixing device 1 that fixes the edge of the ridge side of the second solar module 100B is the same as the method of attaching the fixing device 1 that fixes the edge of the ridge side of the first solar module 100A, the explanation thereof will be omitted. The third solar module 100 and the solar module 100 thereafter can also be attached to the roof by repeating the same method.

According to the fixing device 1 of the present embodiment that is configured in the above manner, the fixing tool 20 of the fixing device 1 can be inserted from the opening portion 230 to the inside of the rack member 200 from any position of the rack member 200. Therefore, even in the case where the rack member 200 is several meters long in the longitudinal direction, or in a configuration where both ends of the rack member 200 are blocked, there is no need to insert the fixing tool 20 from the end portion of the rack member 200, and the fixing device 1 can be inserted from the opening portion 230 near the fixing position of the solar module 100. The fixing device 1 can of course be detached from any position of the rack member 200.

The fixing device 1 is configured so that the distance K1 between a pair of pressure contact portions 25a and 25b is longer than the distance K2 and the distance L4, and shorter than L3. Therefore, by the series of operations of FIG. 5 to FIG. 11, the fixing device 1 is capable of arranging the first pressure contact portion 25a and the second pressure contact portion 25b of the fixing device 1 along the longitudinal direction of the supporting plate portion 210 of the rack member 200.

That is, even in the case where the installation position of the fixing tool 20 is shifted from a state shown in FIG. 3 to one of the sides in the horizontal direction of the illustration, which is a direction orthogonal to the longitudinal direction of the rack member 200, the first pressure contact portion 25a or the second pressure contact portion 25b would not become detached from the supporting plate portion 210 and cause the fixing device 1 to become detached from the rack member 200.

Furthermore, according to the fixing device 1 of the present embodiment, the pressing tool 10 and the fixing tool 20 are assembled by the projecting portion 19 and the connection hole 27. This allows the pressing tool 10 and the fixing tool 20 to always rotate integrally in the rotation operation of the fixing device 1 shown in FIG. 11. Therefore, there is no possibility of only the fixing tool 20 failing to rotate and being stopped at the insertion position shown in FIG. 9.

Furthermore, according to the fixing device 1 of the present embodiment, the fixing device 1 comprises the projecting portion 19 as show in FIG. 2. The projecting portion 19, for example, functions as a supporting member that abuts the rack member 200 and supports the solar module 100 when force is applied from the ridge side towards the eave side on the solar module 100 such as by snow accumulated on the roof. This prevents deformation or breakage of the solar module 100 caused by pressure applied on the solar module 100. Therefore, the fixing device 1 allows the solar module 100 to be installed even in areas where there is much snow.

Furthermore, according to the fixing device 1 of the present embodiment, in the case where a force is applied from the ridge side towards the eave side of the solar module 100, the leg portion 13d is configured so that the distal end thereof abuts the bottom plate portion 270 of the rack member 200. This allows the leg portion 13d to support the solar module 100 against the applied force.

By being comprised of the leg portion 13d and the projecting portion 19, the fixing device 1 of the present embodiment has a self-sustainable structure. Therefore, after the fixing device 1 is inserted from the opening portion 230 of the rack member 200, the fixing device 1 can be fitted together with the solar module 100 only by being slid along the bottom plate portion 270 of the rack member 200 towards the solar module 100 in a self-sustained state, which allows favorable workability.

The plurality of convex portions 13e provided on the leg portion 13d function as identification marks. For example, in the case where a plurality of types of pressing tools 10 are manufactured in accordance with the thickness of the solar module 100, the required pressing tools 10 can be immediately identified by changing the number of the convex portions 13e in accordance with the length of the first extending portion 11.

Furthermore, according to the fixing device 1 of the present embodiment, since the grounding portion 22 is provided integrally in the fixing tool 20, there is no need to mount a grounding portion separately along the rack member 200. In addition, the grounding portion 22 has at least one protrusion 23 with a sharp tip end. The protrusion 23 is provided at a position that overlaps with the pressing portion 15 of the pressing tool 10 in a thickness direction of the solar module 100. The protrusion 23 is capable of penetrating the plating on the back surface 120 of the frame 130 by fastening the bolt 30. Therefore, since there is no need to peel off the plating on the back surface 120 at a position where the grounding portion 22 is to be grounded in advance to expose the metal surface of the frame main body, excellent workability is obtained.

Furthermore, the distance from the contact surface 18 of the second pressing portion 14 of the pressing tool 10 to the surface of the supporting plate portion 210 is configured slightly longer than the distance from the contact surface 16 of the first pressing portion 12 to the surface of the supporting plate portion 210. Therefore, when fitting the second solar module 100B between the contact surface 18 of the second pressing portion 14 and the supporting plate portion 210 after fixing the first solar module 100A, the second solar module 100B can be fitted from diagonally above, thus providing favorable workability.

Furthermore, according to the fixing device 1 of the present embodiment, the grounding portion 22 is configured obliquely in the manner shown in FIG. 4. In other words, the grounding portion 22 is provided in a manner that one end of the alignment direction of the protrusions 23 is oblique towards the first extending portion 11. This tilt causes water that has entered the base portion 26 to flow, and prevents puddles from forming. That is, this tilt allows the water entering the base portion 26 to be drained along the connecting portion configured by the base portion 26 and the grounding portion 22. Furthermore, the grounding portion 22 comprises a drain hole 21 at a portion that is connected with the base portion 26. This allows the fixing tool 20 to further enhance water drainage function. This allows the fixing device 1 to prevent rust.

Furthermore, the second extending portion 13 of the pressing tool 10 is extended to the second solar module 100B side that is to be arranged later on. That is, the second extending portion 13 is provided on the second pressing portion 14 side. Therefore, when fixing the first solar module 100A, the second extending portion 13 would not be covered by the first solar module 100A. Furthermore, since the operator can always perform the fastening operation of the bolt 30 more on the ridge side than the solar module 100 to which the fixing operation is performed, the operator would not mistakenly step on the solar battery cells 150 of the solar module 100 during the fastening operation of the bolt 30.

Furthermore, also during the insertion operation to the rack member 200, the fixing device 1 of the present embodiment would not be separated into the pressing tool 10 and the fixing tool 20. Therefore, even at an unstable place such as on the roof, since the solar module 100 is attached to the rack member 200 by a simple operation using the temporarily fastened fixing device 1, and can also be grounded, favorable workability is obtained.

The present invention is not limited to the foregoing embodiment. For example, although the pressing tool 10 is described as being formed by extrusion, the manufacturing method is not limited to this. For example, the first extending portion 11, the second extending portion 13, the pressing portion 15, the leg portion 13d, and the projecting portion 19 can be connected by welding, or can be molded by pressing.

Furthermore, similarly, in the present embodiment, the fixing tool 20 is obtained by integrally manufacturing the first pressure contact portion 25a, the second pressure contact portion 25b, and the grounding portion 22 by bending. However, the manufacturing method is not limited to this. That is, each of the members can be formed separately.

Furthermore, the projecting portion 19 of the pressing tool 10 and the connection hole 27 of the fixing tool 20 can be provided vice-versa. That is, the connection hole 27 can be provided on the second extending portion 13 of the pressing tool 10, and the projecting portion 19 can be provided on the base portion 26 of the fixing tool 20.

Furthermore, in the fixing device 1 of the present embodiment, the distal end of the leg portion 13d is inserted into the first side plate portion 290 side and tilted to insert the fixing tool 20 inside the rack member 200 from the opening portion 230; however, it is not limited thereto. That is, in the fixing device 1, it is also possible to insert the fixing tool 20 inside the rack member 200 from the opening portion 230 by inserting the distal end of the leg portion 13d into the second side plate portion 291 side and tilting it.

In the present embodiment, the fixing device 1 that fixes the solar module 100 on the rack member 200 is explained; however, an object to be fixed on the rack member 200 is not limited to the solar module 100. As long as it is a panel that can be clamped and fixed by the fixing device 1, other members may also be utilized as the panel.

Other than the above, for the fixing device 1, various modifications may be carried out without departing from the spirit of the present invention.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A fixing device comprising:
   a pressing tool that abuts a part of a peripheral portion of a panel that is arranged on an upper surface portion of a hollow rod-like rack member, the rack member comprising on the upper surface portion a slit-like opening portion that extends along a longitudinal direction;
   a fixing tool that abuts a back surface of the upper surface portion, the fixing tool configured insertable to the opening portion, and having in one direction a width wider than a width in a direction orthogonal to a longitudinal direction of the opening portion; and
   a fastening member that integrally fixes the pressing tool and the fixing tool that abut a part of the peripheral portion of the panel and the back surface of the upper surface portion of the rack member, respectively, wherein
   the pressing tool comprises a plate-like first extending portion elongated in one direction, a pressing portion being an end portion of the first extending portion, extending in a thickness direction of the first extending portion, and abutting a part of the peripheral portion of the panel, and a second extending portion extending from another end of the first extending portion to the thickness direction of the first extending portion, and comprising a first bolt hole through which the fastening member can be inserted, and
   the fixing tool comprises a plate-like base portion facing the second extending portion and comprising a second bolt hole that faces the first bolt hole of the second extending portion and through which the fastening member can be inserted, a pair of pressure contact portions arranged apart on the base portion in a width wider than the width of the opening portion and narrower than a width between inner surfaces of a pair of facing side plate portions of the rack member, and are abuttable to the back surface of the upper surface portion, and a grounding portion that is provided on an end portion opposite to the second extending portion side of the pressing tool that is connected to the fixing tool at an end portion of the base portion, the grounding portion extending in a direction in which the pressure contact portions extend.

2. The fixing device according to claim 1, wherein the fixing tool is such that a length of one of two diagonal lines joining diagonal corners of four corners provided on an outer side of the pair of pressure contact portions is shorter than a length of the other diagonal line.

3. The fixing device according to claim 1, wherein
   the pressing portion comprises a first pressing portion that extends in an opposite direction of a direction in which the second extending portion extends, and a second pressing portion that extends in a direction in which the second extending portion extends, and
   a distance between a contact surface of the second pressing portion and a surface of the second extending portion is formed longer than a distance between a contact surface of the first pressing portion and the surface of the second extending portion.

4. The fixing device according to claim 1, wherein the fixing tool comprises a penetrating drain hole at a connection part of the grounding portion and the base portion.

5. A panel installation method, comprising:
   inserting from an opening portion into a rack member a fixing tool of a fixing device, the fixing device comprising a pressing tool that abuts a part of a peripheral portion of a panel that is arranged on an upper surface portion of the rack member that is hollow and shaped rod-like, the rack member comprising on the upper surface portion a slit-like opening portion that extends along a longitudinal direction, a fixing tool that abuts a back surface of the upper surface portion, the fixing tool configured insertable to the opening portion, and having in one direction a width wider than a width in a direction orthogonal to a longitudinal direction of the opening portion, and a fastening member that integrally fixes the pressing tool and the fixing tool that abut a part of the peripheral portion of the panel and the back surface of the upper surface portion of the rack member, respectively, wherein the pressing tool comprises a plate-like first extending portion elongated in one direction, a pressing portion being an end portion of the first extending portion, extending in a thickness direction of the first extending portion, and abutting a part of the peripheral portion of the panel, and a second extending portion extending from another end of the first extending portion to the thickness direction of the first extending portion, and comprising a first bolt hole through which the fastening member can be inserted, and the fixing tool comprises a plate-like base portion facing the second extending portion and comprising a second bolt hole that faces the first bolt hole of the second extending portion and through which the fastening member can be inserted, a pair of pressure contact portions arranged apart on the base portion in a width wider than the width of the opening portion and narrower than a width between inner surfaces of a pair of facing side plate portions of the rack member, and are abuttable to the back surface of the upper surface portion, and a grounding portion that is provided on an end portion opposite to the second extending portion side of the pressing tool that is connected to the fixing tool of the base portion, the grounding portion extending in a direction in which the pressure contact portions extend;

rotating the fixing tool so that the one direction of the fixing tool is rotated in a direction along a direction orthogonal to a longitudinal direction of the rack member;

arranging a part of the peripheral portion of the panel between the pressing tool and the upper surface portion of the rack member; and connection the pressing tool and the fixing tool integrally by the fastening member.

* * * * *